US006247715B1

(12) United States Patent
Korosue

(10) Patent No.: US 6,247,715 B1
(45) Date of Patent: Jun. 19, 2001

(54) LEVER-OPERATED WHEELCHAIR

(76) Inventor: Akira Korosue, 7-1, Tokiwa-cho, Nishinomiya-shi, Hyogo-ken (JP)

( * ) Notice: Subject to any disclaimer, the term of this patent is extended or adjusted under 35 U.S.C. 154(b) by 0 days.

(21) Appl. No.: 09/172,793

(22) Filed: Oct. 15, 1998

(30) Foreign Application Priority Data

Oct. 23, 1997 (JP) ........................................ 9-310007

(51) Int. Cl.[7] ........................................ B62M 1/16

(52) U.S. Cl. .................. 280/242.1; 280/244; 280/250.1; 74/523; 74/528; 74/545; 192/415

(58) Field of Search ............................ 280/250.1, 242.1, 280/244, 246, 255, 264, 253, 245, 247, 248, 304.1, 214; 74/523, 528, 545; 192/48.92, 37, 41 S

(56) References Cited

U.S. PATENT DOCUMENTS

| | | | | |
|---|---|---|---|---|
| 323,085 | * | 7/1885 | Taylor | 280/253 |
| 4,453,729 | * | 6/1984 | Lucken | 280/242.1 |
| 4,506,900 | * | 3/1985 | Korosue | 280/242.1 |
| 4,560,181 | * | 12/1985 | Herron | 280/244 |
| 4,682,784 | * | 7/1987 | Anderson | 280/242.1 |
| 5,358,266 | * | 10/1994 | Roth et al. | 280/304.1 |
| 5,722,675 | * | 3/1998 | Yang | 280/244 |
| 5,826,897 | * | 10/1998 | Beard | 280/250.1 |
| 5,909,781 | * | 6/1999 | Yonekawa et al. | 280/214 |

* cited by examiner

*Primary Examiner*—Michael Mar
*Assistant Examiner*—Hau Phan
(74) *Attorney, Agent, or Firm*—Koda & Androlia

(57) ABSTRACT

To produce a wheelchair with high forward-moving efficiency, incorporating a simple structured driving mechanism that is compact enough to be fitted between the wheel and the frame. Thanks to this driving mechanism, the wheelchair moves forward not only when the operation lever is pushed but also when it is pulled. For the less frequent backward movement, the push rim continues to be used. An operation lever 2 is rockably established on each of the left and right sides of the moving direction of frame 1. Each operation lever 2 is provided with a pair of one-way-clutch-driving links $\mathbf{4_1}$, $\mathbf{4_2}$, in such a way that one ends of these $\mathbf{4_1}$, $\mathbf{4_2}$, are linked to the operation lever 2 via mutually spaced apart sub pivots $\mathbf{5_1}$, $\mathbf{5_2}$ at a certain distance forward from said main pivot 3, while the other ends of said links $\mathbf{4_1}$, $\mathbf{4_2}$ are linked to a pair of forward and backward arms $\mathbf{7_1}$, $\mathbf{7_2}$, which are established on opposite sides of a hub spindle of a one-way clutch. Every time the operation lever 2 is pushed or pulled, the bases of said arms $\mathbf{7_1}$, $\mathbf{7_2}$ engage with the one-way clutch, thereby driving a hub 11, which is established on the periphery of the one-way clutch and fastened to a wheel 12, in a normal rotational direction causing the wheelchair to move forward.

5 Claims, 4 Drawing Sheets

LEVER-OPERATED WHEELCHAIR

BACKGROUND OF THE INVENTION

1. Field of the Invention

The present invention relates to a lever-operated wheelchair, which can be moved forward or maneuvered as one pleases by simply operating a lever or levers. More specifically, this invention relates to a wheelchair that is moved forward by the power generated by a reciprocating movement of an operation lever, and backward by the operation of push rims.

2. Prior Art

Most of the conventional hand-operated wheelchairs are operated with push rims, i.e., operation rings that are attached to the rims of the wheels. In order to make it possible to operate a wheelchair with one hand, the applicant of this invention proposed a lever-operated wheelchair for one-hand operation in the Japanese Patent Application No. 190091/1981 (Japanese Patent Publication No. 58808/1985). This wheelchair has an operation lever, which can be pushed forward or pulled backward from the neutral position to rotate the wheels forward or backward correspondingly. This wheelchair was granted a patent (Pat. No. 1330760) and has been widely used for one-hand operation applications. While this wheelchair moves forward when the operation lever is pushed forward, another type of wheelchair employing a pulling motion, which is thought to produce stronger power than a pushing motion, for the forward movement was proposed in the Japanese Patent Application No. 274210/1994 (Japanese Patent Laid-Open No. 103465/1996). This latter wheelchair is designed to use both hands. Apart from wheelchairs, a tricycle that is driven forward when a linearly reciprocal lever is pushed or pulled was published on pp. 78–79 of the Feb. 17, 1997, issue of the Nikkei Mechanical Magazine.

The two types of lever-operated wheelchairs for one-hand operation cited above are moved forward only when the lever is pushed (in the case of the former wheelchair) or only when the lever is pulled (in the case of the latter wheelchair). The tricycle, on the other hand, has a mechanism that uses both a push and a pull of the lever to move the tricycle forward, but this mechanism, comprising two roller clutches and five bearing gears, is very complicated and bulky, and is therefore difficult to be used in a wheelchair.

SUMMARY OF THE INVENTION

The present invention has been conceived in the light of the above points, with the object of providing a wheelchair having a simple and compact driving mechanism that is easily built into the wheelchair because it can be fitted between the wheel and the frame, and that efficiently moves the wheelchair forward by using both the push and the pull of the operation lever, while the push rim is continued to be used for the less frequent backward movement of the wheelchair.

In order to achieve the above object, the present invention presents a lever-operated wheelchair that is moved forward by operating a lever in a reciprocating motion and has a push rim on a wheel, comprising an operation lever rockably supported on a main pivot on each of the left and right sides of a frame, wherein each operating lever is provided with a pair of one-way-clutch-driving links in such a way that one ends of these links are linked to the operation lever via mutually spaced apart sub pivots at a certain distance forward from the main pivot, while the other ends of the links are linked to a pair of forward and backward arms, which are established on opposite sides of a hub spindle of a one-way clutch. These elements are configured in such a way that every time the operation lever is pushed or pulled, the bases of the arms engage with the one-way clutch, thereby driving a hub, which is established on the periphery of the one-way clutch and fastened to a wheel , in a normal rotational direction causing the wheelchair to move forward.

Thanks to the above configuration, in an alternating motion of the operation lever, when the operation lever moves forward, the driving force of the operation lever drives the forward arm of the one-way clutch in a normal rotational direction (and the backward arm in a reverse rotational direction) via the one-way-clutch-driving link, and the base of the arm frictionally engages with the one-way clutch and drives the hub, which is established on the periphery of the one-way clutch and fastened on the wheel, in a normal rotational direction, whereas when the operation lever moves backward, the driving force of the operation lever drives the backward arm of the one-way clutch in a normal rotational direction (and the forward arm in a reverse rotational direction) via the one-way-clutch-driving link, and the base of the arm frictionally engages with the one-way clutch and drives the aforementioned hub in a normal rotational direction, thereby moving the wheelchair forward with either movement of the operation lever.

In the above configuration, in order to drive the hub in a normal rotational direction by engaging the bases of the arms with the one-way clutch, it is effective to employ a configuration wherein the bases of the pair of arms of the one-way clutch are rotatably and coaxially mounted on the hub spindle, which is fastened to the frame of the wheelchair, in such a way that one rests on the periphery of the other, and the forward arm and the backward arm are linked to a one-way clutch main body via a normal rotation one-way clutch and a reverse rotation one-way clutch respectively, the clutch main body being provided with a spring clutch wound around its periphery, the spring clutch having projections on its both ends, one of which being inserted and settled in a groove formed on the clutch main body and the other of which being inserted and settled in a groove of a spring-clutch-end-supporting disc established via a normally rotating one-way clutch on the periphery of the hub spindle so that the hub is engaged and linked to the clutch main body via the spring clutch.

In this way, the one-way clutch part can be inserted into the hub to make a unit construction, and whenever the forward arm rotates in a normal direction or the backward arm rotates in a reverse direction, the one-way clutch is easily rotated in a normal direction.

On the other hand, when moving the wheelchair backward using the push rim the projection of the spring clutch inserted into the groove of the spring-clutch-end-supporting disc, i.e., the projection that is opposite the projection inserted into the groove of the one-way clutch main body, becomes stationary because the one-way clutch prevents the supporting disc from rotating backward. As a result when the push rim is pushed backward, the spring clutch is contracted, and the hub reversely rotates while slipping on the spring clutch, making it possible for the wheelchair to move backward smoothly.

Preferably the distance between the sub pivots linking the one-way-clutch-driving links to the operation lever and the main pivot of the operation lever can be extended or shortened. When the sub pivots are positioned farther than the standard positions from the main pivot, more power is required to push or pull the lever, but the stroke of the operation lever can be shortened. On the other hand when the sub pivots are positioned closer than the standard positions to the main pivot, less power is required to operate the lever, but the stroke of the operation lever has to be longer. Accordingly, the former type is suitable for a physically strong user while the latter type is suitable for a user with less physical strength.

In the above configuration, a balance spring is preferably established on the opposite side of the main pivot of the operation lever from the rockably attached sub pivots linking the one-way-clutch-driving links to the operation lever, so as to counterbalance the weight of the operation lever and one-way-clutch-driving links which are positioned forward of the main pivot.

DETAILED DESCRIPTION OF THE PREFERRED EMBODIMENTS

The embodiments of the present invention will now be described with reference to the accompanying drawings.

Figure 1:
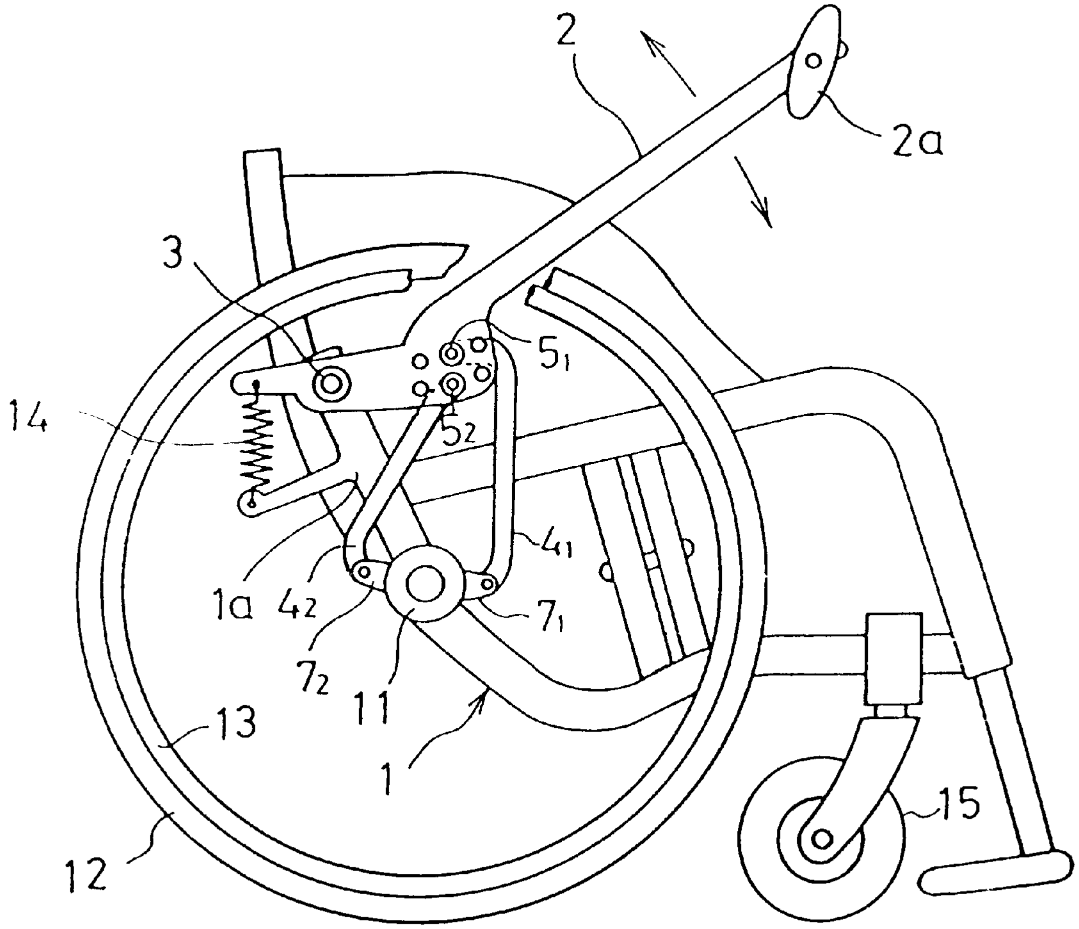
FIG. 1 is a side view of a lever-operated wheelchair according to the present invention.
Figure 2:
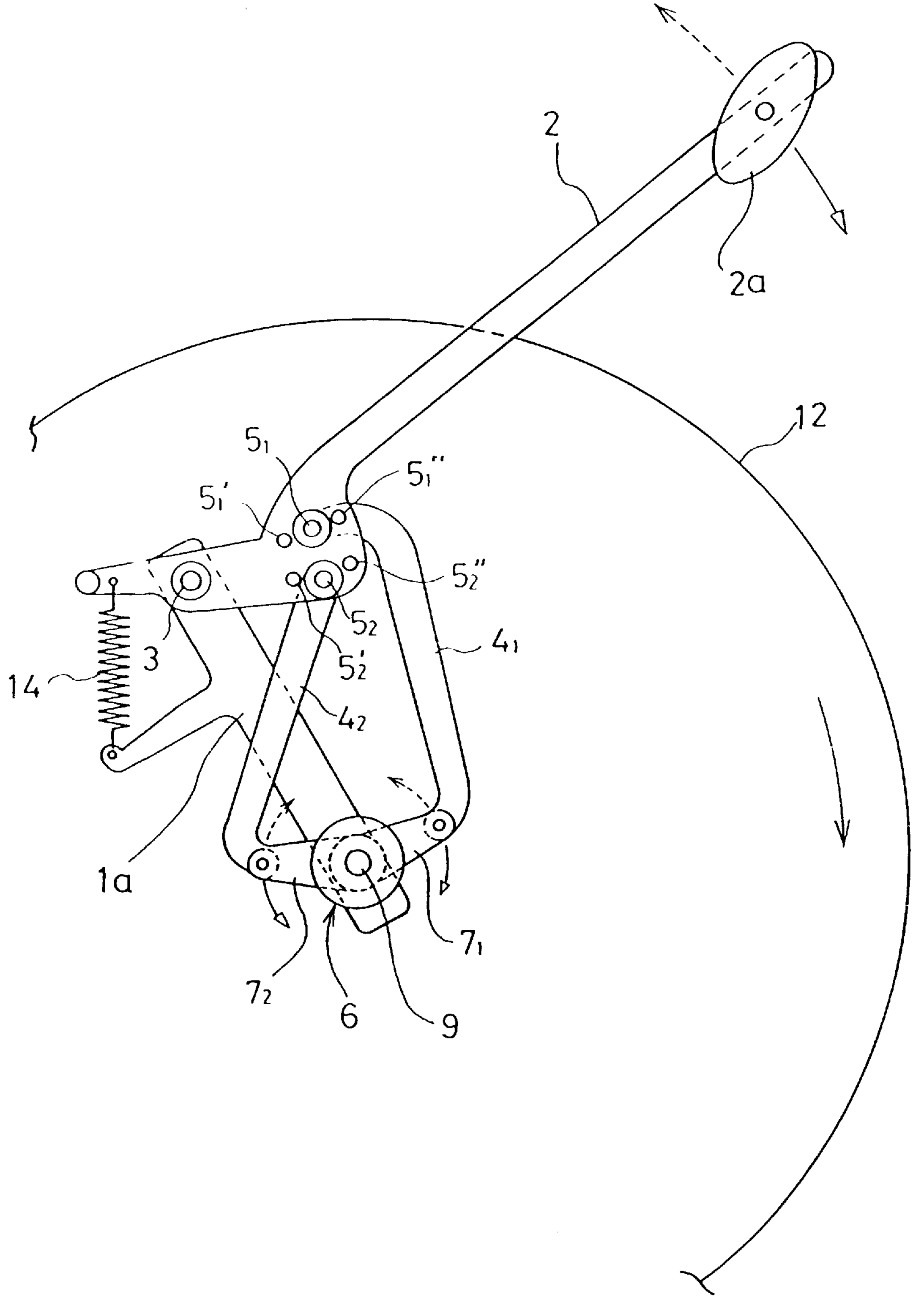
FIG. 2 is a side view of a drive mechanism (right-hand side)

FIG. I is a side view of a lever-operated wheelchair in accordance with the present invention, and FIG. 2 is a side view of a driving mechanism on the right-hand side of the wheelchair shown in FIG. 1.

The wheelchair has a frame 1 equipped with a wheel 12 on either side, i.e., one on the right-hand side and the other on the left-hand side. Each wheel 12 has a push rim 13 attached to it. At the front lower part of the frame 1, castor wheels 15 are provided to facilitate directional changes of the wheelchair.

A hub 11, which is provided at the center of the wheel 12 so as to support the wheel 12, has a built-in one-way clutch 6. The one-way clutch 6 is part of the driving mechanism, which is equipped with an operation lever 2 and fitted in the gap between the wheel 12 and the frame 1 (see FIG. 1). The purpose of the driving mechanism is to drive the one-way clutch 6, and accordingly the hub 11, so that they will rotate in a normal direction whenever the operation lever 2 reciprocates, in other words, to drive the one-way clutch 6 in a normal rotational direction by driving a pair of arms of the one-way clutch 6, i.e., a forward arm $\mathbf{7}_1$ and a backward arm $\mathbf{7}_2$, which are on the opposite sides of the hub axis 9, whenever the operation lever 2 is operated.

The top end of the operation lever 12 is provided with a flat knob 2*a*, whereas the base part is linked to the top end of an anchoring member 1*a*, which is fastened to a certain portion of the side of the frame 1, via a main pivot 3 in such a way that the lever extends upwardly forwards. The operation lever 2 is also linked to one-way-clutch-driving links $\mathbf{4}_1$, $\mathbf{4}_2$, which are used to drive the one-way clutch 6, via sub pivots $\mathbf{5}_1$, $\mathbf{5}_2$, which are spaced apart from each other and disposed at a certain distance forward from the main pivot 3 of the operation lever 2, wherein the driving link $\mathbf{4}_1$, which is on the normal rotation side of the clutch-driving link, is linked to the forward arm $\mathbf{7}_1$ of the one-way clutch 6, and the driving link $\mathbf{4}_2$, which is on the reverse rotation side, is linked to the backward arm $\mathbf{7}_2$ of the one-way clutch 6. Because of this mechanism, when the operation lever 2 is pushed (so that the lever moves downwardly forwards), the clutch-driving links $\mathbf{4}_1$ and $\mathbf{4}_2$ move downwards, rotating the forward arm $\mathbf{7}_1$ in a normal rotational direction (clockwise in FIG. 2) and rotating the backward arm $\mathbf{7}_2$ in a reverse rotational direction (counterclockwise in FIG. 2). When the operation lever 2 is pulled, the clutch-driving links $\mathbf{4}_1$ and $\mathbf{4}_2$ move upwards, rotating the forward arm $\mathbf{7}_1$ in a reverse rotational direction (counterclockwise in FIG. 2) and rotating the backward arm $\mathbf{7}_2$ in a normal rotational direction (clockwise in FIG. 2).

When the operation lever 2 moves forward, the forward arm $\mathbf{7}_1$ rotates forward (clockwise in FIG. 2) and, as described later, a normal rotation roller clutch $\mathbf{8}_1$ acts on the one-way clutch 6 to give it forward driving force, while the backward arm $\mathbf{7}_2$ rotates backward (counterclockwise in FIG. 2), but since a reverse rotation roller clutch $\mathbf{8}_2$ does not act, the one-way clutch 6 rotates normally and turns the wheel 12 in a normal direction via hub 11. When the operation lever 2 moves backward (see the dotted arrow in FIG. 2), the forward arm $\mathbf{7}_1$ rotates backward (counterclockwise in FIG. 2), and the normal rotation roller clutch $\mathbf{8}_1$ does not act on the one-way clutch 6, while the backward arm $\mathbf{7}_2$ rotates forward (clockwise in FIG. 2), and because the reverse rotation roller clutch $\mathbf{8}_2$ acts this time, the roller clutch 6 rotates normally and turns the wheel 12 in a normal direction via hub 11.

The sub pivots $\mathbf{5}_1$, $\mathbf{5}_2$ linking the pair of one-way-clutch-driving links $\mathbf{4}_1$, $\mathbf{4}_2$ to the operation lever 2 can be converted, according to the physical power of the user of the wheelchair, to $\mathbf{5}_1''$, $\mathbf{5}_2''$, which are farther from the pivot 3 and more suitable for a physically stronger user, or to $\mathbf{5}_1'$, $\mathbf{5}_2'$, which are closer to the pivot 3 and more suitable for a physically weaker user.

Between a point of the operation lever 2, which is at a certain distance from the pivot 3 and is on the opposite side from the sub pivots $\mathbf{5}_1$, $\mathbf{5}_2$ linking the pair of one-way-clutch-driving links $\mathbf{4}_1$, $\mathbf{4}_2$ to the operation lever 2, and the tip of a stem projecting from the middle of the anchoring member 1*a* of the wheelchair frame 1, a balance spring 14 that counterbalances the weight of the operation lever 2, which is provided with the knob 2*a* at a position forward of the pivot 3, and of the one-way-clutch-driving links $\mathbf{4}_1$, $\mathbf{4}_2$, is established so as to lessen the effort needed to push and pull the operation lever 2. The flat knob 2*a* is axially fastened to the tip of the operation lever 2 so it is easy to apply force on it when moving the lever, making it easy for the user to operate the lever when using the wheelchair.

The operation lever 2 is provided on either side of the wheelchair. The user can easily turn the direction of the wheelchair by differentiating the driving force applied on the left and right operation levers 2. When moving backward, the push rim 13 attached to each wheel 12 can be operated, thereby easily moving the wheelchair backward. The efficiency of forward moving, which is the dominant moving mode of the wheelchair, can be improved by making use of both the forward and backward operations of both the left and right operation levers. Moreover, the forward moving speed can also increased.

The clutch device driven by the clutch-driving links $\mathbf{4}_1$, $\mathbf{4}_2$ will now be described.

Figure 3:
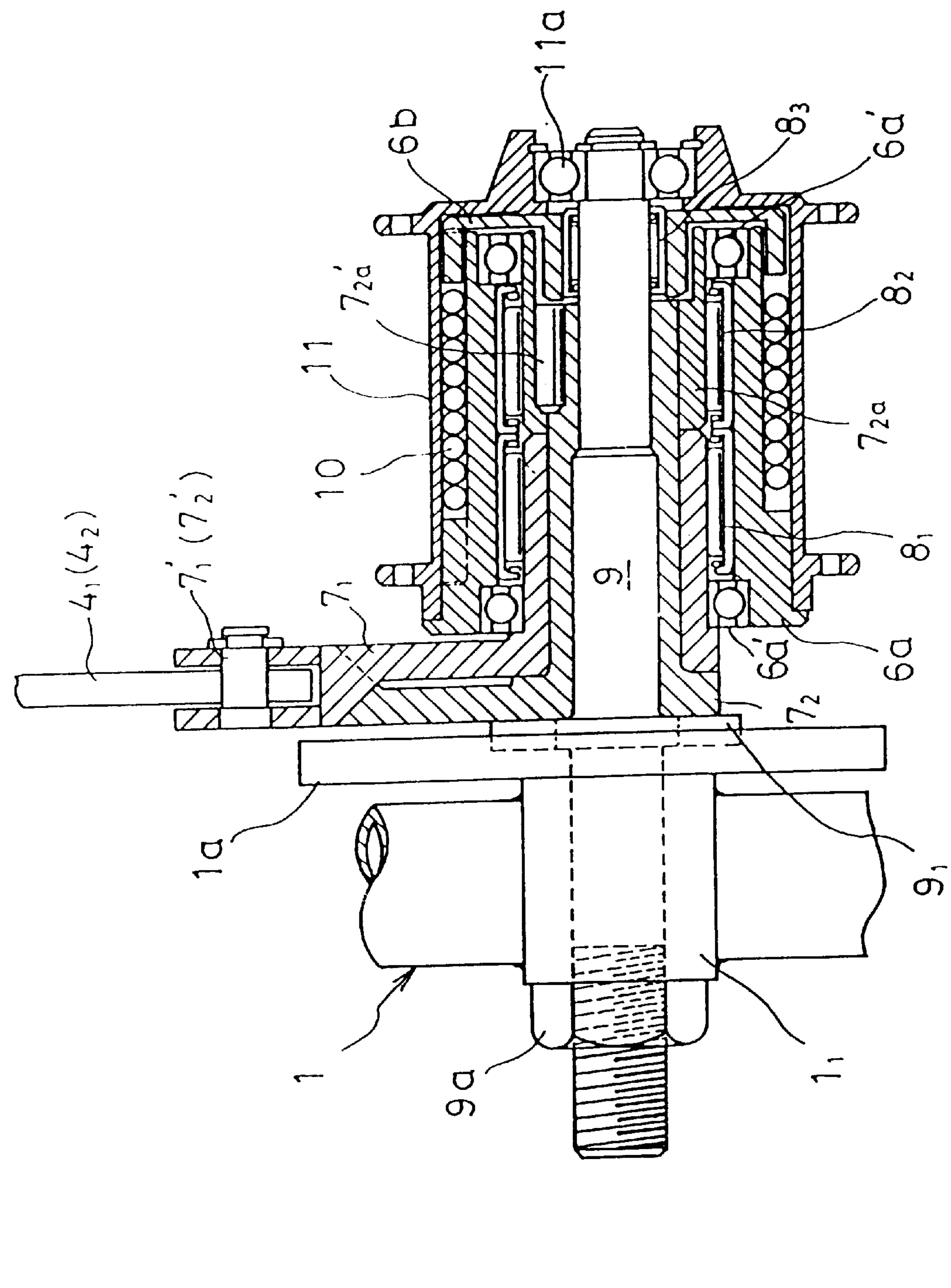
FIG. 3 is a longitudinal sectional view of a clutch device.
Figure 4:
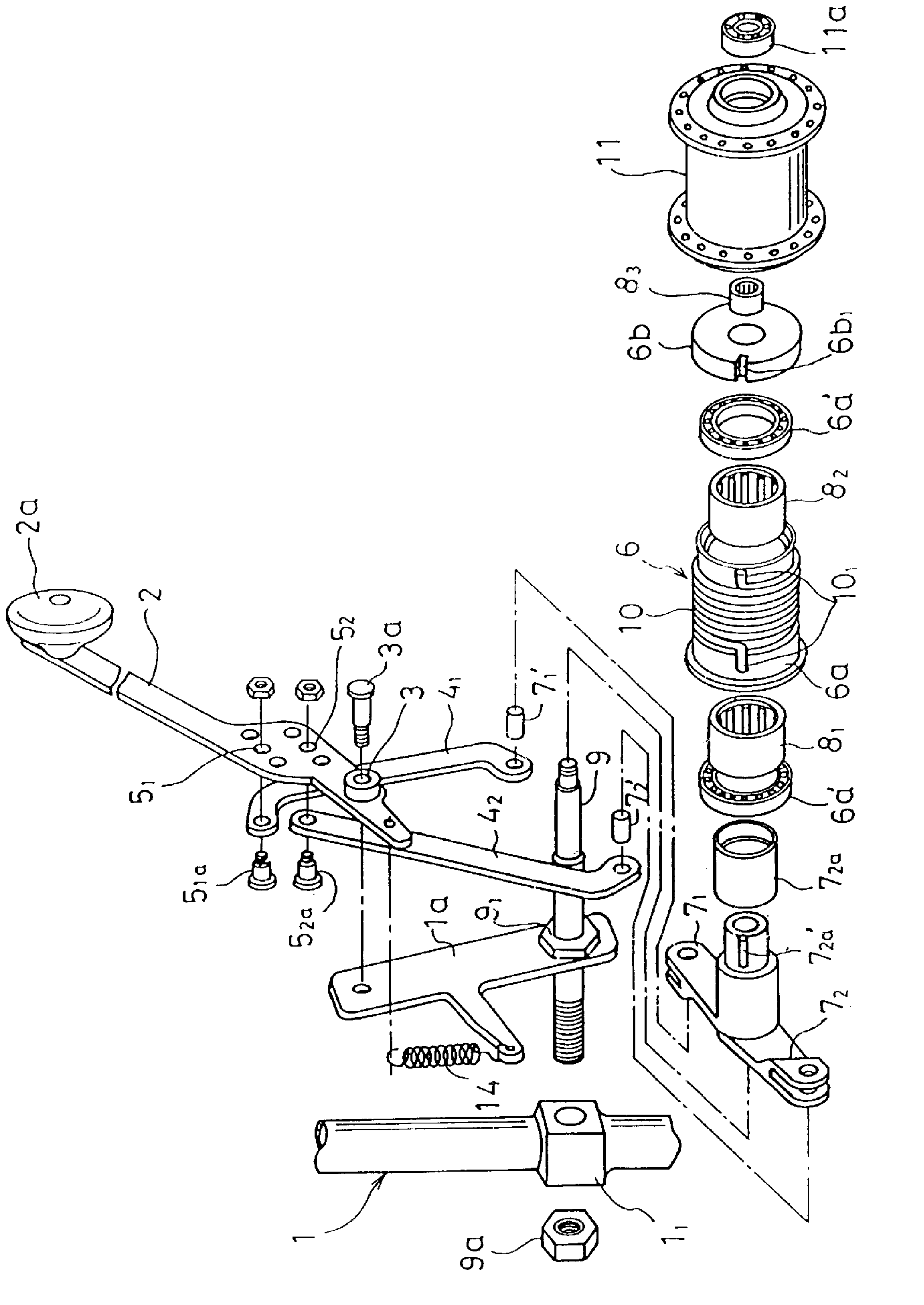
FIG. 4 is an exploded perspective view of the drive mechanism and the clutch device.

FIG. 3 is a longitudinal sectional view of a clutch device for rotating hub 11, and FIG. 4 is a perspective view of a driving mechanism and a clutch device that are inserted and settled between the frame 1 and wheel 12.

The clutch device is supported on a hub spindle 9, which runs through a bolt head $\mathbf{9}_1$, the anchoring member 1*a* for rockably supporting the operation lever 2, and a bracket $\mathbf{1}_1$ soldered to the pipe frame 1. The bolt head $\mathbf{9}_1$ fastens the anchoring member 1*a* to the pipe frame 1. The hub spindle 9 has a threaded end, which is screwed into a hexagon nut 9*a* and fastened on the other side of the bracket $\mathbf{1}_1$.

The forward arms $\mathbf{7}_1$ and backward arms $\mathbf{7}_2$ driven by the clutch-driving links $\mathbf{4}_1$, $\mathbf{4}_2$ via pins $7_1'$, $7_2'$ are mounted in such a way that their bases are mounted onto the hub spindle 9 in an overlapped condition, and the side surface of the backward arm $\mathbf{7}_2$ contacts the bolt heat $\mathbf{9}_1$ of the hub 9 (see FIG. 3). On the periphery of the base of the forward arm $\mathbf{7}_1$, which is the outer of the two arms, a ball bearing 6*a*' turnably supporting one of the arms of the one-way clutch main body 6*a* is fitted between the periphery of the base and clutch main body 6*a*, while the reverse rotation roller clutch $\mathbf{8}_1$, which frictionally drives the one-way clutch main body 6*a* only in the normal rotational direction is press fitted onto the inner surface of the clutch main body 6*a*.

On the periphery of the base of the backward arm $\mathbf{7}_2$, a tube $\mathbf{7}_2a$ is fastened via a key $\mathbf{7}_2a'$ in order to align the reverse rotation roller clutch $\mathbf{8}_2$ with the periphery of the forward arm $\mathbf{7}_1$ so that they become a unit. The reverse rotation roller clutch $\mathbf{8}_2$, which is a one-way clutch frictionally driving the one-way clutch 6*a* only in the normal rotational direction, is press fitted between the tube $\mathbf{7}_2a$ and the one-way clutch main body 6*a*. The ball bearing 6*a*' is fitted between the periphery of the tube $\mathbf{7}_2a$ and the outward portion of the inner surface of the one-way clutch main body 6*a*.

On the outward portion (right-hand side in FIG. 3) of the base of the backward arm $\mathbf{7}_2$ and on the hub spindle 9, a clutch-end supporting disk 6*b* provided with a groove $\mathbf{6}b_1$ (see FIG. 4) for supporting a projection $\mathbf{10}_1$ of a later-described spring clutch 10 is established with a normally rotating small one-way clutch $\mathbf{8}_3$ press fitted onto the inner surface of the supporting disk 6*b*.

The spring clutch 10 has a spring of a certain number of turns wound around the periphery of the one-way clutch main body 6*a*. The projection $\mathbf{10}_1$ on the arm side is inserted and settled in the groove of the main body 6*a* while the projection $\mathbf{10}_1$ on the other side is inserted and settled in the groove $\mathbf{6}b_1$ of the spring-clutch-end-supporting disc 6*b*. The periphery of the spring clutch 10 is fitted with the hub 11 to which the wheel 12 is attached via spokes (not shown). The outward end of the hub 11 is supported by the outward end of the hub spindle 9 via a ball bearing 11*a*. When the forward arm $\mathbf{7}_1$ makes a normal rotation, the one-way clutch main body 6*a* meshes with the base of the forward arm $\mathbf{7}_1$ via the normal rotation one-way clutch $\mathbf{8}_1$, widening the spring clutch (expanding its diameter), meshing the hub 11 and rotating it in the normal rotational direction (idling the reverse rotation one-way clutch $\mathbf{8}_2$), thereby moving the wheelchair forward. When the operation lever 2 ceases to move forward, stopping the normal rotation of the forward arm $\mathbf{7}_1$ and the reverse rotation of the backward arm $\mathbf{7}_2$, the inertia of the wheel 12 rotates the hub 11 and the one-way clutch main body 6*a* connected to which via the spring clutch 10 in the normal rotational direction, thereby moving the wheelchair forward.

In order to move the wheelchair backward, the push rim 13 attached to the side of the wheel 12 is turned backward by hand. When the backward rotation of the push rim 13 turns the hub 11 backward, because the projection $\mathbf{10}_1$ of the spring clutch 10 is inserted and settled in the groove $\mathbf{6}b_1$ of the spring-clutch-end-supporting disk 6*b*, the outward end of the spring clutch 10 becomes immobile, tightening the clutch-spring diameter, and the hub 11 slips on the clutch 10 and turns backward, moving the wheelchair backward without any difficulty. In this way, by moving the operation lever 2 forward and backward, the hub can always be made to rotate in a normal direction, and the wheelchair can be moved forward efficiently, while the backward movement of the wheelchair can be easily effectuated by moving the push rim 13 backward. For changing the direction of the wheelchair, the left and right operation levers 2 and push rims 13 are used.

According to the lever-operated wheelchair of the present invention, the wheelchair can be moved forward not only when moving the operation lever forward but also when the operation lever is moved backward. In addition, the driving mechanism can be made compact and simple and fitted in the gap between the frame and the wheel of the wheelchair, making it possible to make a wheelchair of a simple structure providing high forward moving efficiency at low cost.

According to the lever-operated wheelchair, the driving force of the reciprocal movement of the operation lever can be efficiently converted into a normal rotation and transmitted to the hub. At the same time, the one-way clutch that allows the wheelchair to move backward without any difficulty by turning the push rim backward can have a compact and durable design that is suitable for mounting on the hub.

According to the invention, by changing the positions of the sub pivots linking the operation lever with the one-way-clutch-driving links for transmitting the driving force of the operation lever to the one-way clutch, a wheelchair that is better suited to a physically stronger person or to a physically weaker person can be easily and selectively provided.

According to the invention, a wheelchair with an operation lever that is easy to reciprocate for moving the wheelchair forward is easily provided.

What is claimed is:

1. A lever-operated wheelchair which is movable only in a forward direction by operating a lever in a reciprocating motion and having push rims (13) on a pair of wheels rotatably mounted on left and right sides of a frame, comprising an operation lever (2) rockably supported at a rearward end on a main pivot (3) on each of the left and right sides of the frame (1), each operating lever (2) is provided with a pair of one-way clutch driving links ($\mathbf{4}_1$, $\mathbf{4}_2$), in such a way that upper ends of said links ($\mathbf{4}_1$, $\mathbf{4}_2$) are pivotally connected to the operation lever (2) via mutually spaced apart sub pivots ($\mathbf{5}_1$, $\mathbf{5}_2$) which are located a predetermined distance forwardly from said main pivot (3), while lower ends of said links ($\mathbf{4}_1$, $\mathbf{4}_2$) are pivotally connected to a pair of forward and backward arms respectively ($\mathbf{7}_1$, $\mathbf{7}_2$), which extend from opposite sides of a hub spindle (9) of a one-way clutch assembly (6), said one-way clutch assembly (6) being provided on a hub (11) of each wheel and comprising a forward rotation clutch ($\mathbf{8}_1$) and a reverse rotation clutch ($\mathbf{8}_2$), wherein every time the operation lever (2) is pushed and pulled in forward and rearward directions respectively, the forward and backward arms ($\mathbf{7}_1$, $\mathbf{7}_2$) operatively engage with said one-way clutch assembly (6) to cause said forward rotation clutch ($\mathbf{8}_1$) to engage and said reverse rotation clutch ($\mathbf{8}_2$) to disengage when said operation lever is pushed and to cause said forward rotation clutch ($\mathbf{8}_1$) to disengage and said reverse rotation clutch ($\mathbf{8}_2$) to engage when said operation lever is pulled, thereby driving said hub (11) and a respective wheel only in a forward direction of rotation.

2. A lever-operated wheelchair as described in claim 1, wherein a clutch main body (6*a*) being provided with a sprig clutch (10) wound around its periphery, said spring clutch (10) having projections ($\mathbf{10}_1$) on its both ends, one of which being inserted and settled in a groove formed on said clutch main body (6*a*) and the other of which being inserted and settled in a groove ($\mathbf{6}b_1$) of a spring-clutch-end-supporting disc (6*b*) established via a normally rotating one-way clutch ($\mathbf{8}_3$) on the periphery of a hub spindle (9) so that the hub (11) is engaged and linked to said clutch main body (6*a*) via the spring clutch (10) whereby the one-way clutch (6) is not affected by backward movement of the push rim (13).

3. A lever-operated wheelchair as described in claim 1 or 2, wherein the distance between the sub pivots ($\mathbf{5}_1$, $\mathbf{5}_2$) linking the one-way-clutch-driving links ($\mathbf{4}_1$, $\mathbf{4}_2$) to the operation lever (2) and the main pivot (3) of the operation lever can be extended or shortened.

4. A lever-operated wheelchair as described in claim 1 or 2, wherein a balance spring (14) is established on the opposite side of the main pivot (3) of the operation lever (2) form the sub pivots ($\mathbf{5}_1$, $\mathbf{5}_2$) linking the one-way-clutch-driving links ($\mathbf{4}_1$, $\mathbf{4}_2$) to the operation lever (2), so as to counterbalance the weight of the operation lever (2) and one-way-clutch-driving links ($\mathbf{4}_1$, $\mathbf{4}_2$), which are positioned forward of the main pivot (3).

5. A lever-operated wheelchair as described in claim 3, wherein a balance spring (14) is established on the opposite side of the main pivot (3) of the operation lever (2) from the sub pivots ($\mathbf{5}_1$, $\mathbf{5}_2$) linking the one-way-clutch-driving links ($\mathbf{4}_1$, $\mathbf{4}_2$) to the operation lever (2), so as to counterbalance the weight of the operation lever (2) and one-way-clutch-driving links ($\mathbf{4}_1$, $\mathbf{4}_2$), which are positioned forward of the main pivot (3).

* * * * *